United States Patent [19]

Ehrlich et al.

[11] Patent Number: 5,509,055
[45] Date of Patent: Apr. 16, 1996

[54] INBOUND TELECOMMUNICATIONS SERVICES RESOURCES MANAGEMENT SYSTEM

[75] Inventors: Karel Ehrlich, Red Bank; David Trutt, Edison, both of N.J.

[73] Assignee: AT&T Corp., Murray Hill, N.J.

[21] Appl. No.: 511,034

[22] Filed: Aug. 3, 1995

Related U.S. Application Data

[63] Continuation of Ser. No. 85,225, Jun. 30, 1993, abandoned.

[51] Int. Cl.$^6$ .......................... H04M 15/06; H04M 5/06
[52] U.S. Cl. .......................... 379/133; 379/111; 379/113; 379/126; 379/309
[58] Field of Search .......................... 379/34, 111, 112, 379/113, 115, 119, 120, 126, 127, 133, 135, 137, 138, 139, 140, 141, 201, 265, 266, 309

[56] References Cited

U.S. PATENT DOCUMENTS

| | | | |
|---|---|---|---|
| 4,156,109 | 5/1979 | Kraushaar et al. | 379/137 |
| 4,408,100 | 10/1983 | Pritz et al. | 379/309 |
| 4,712,230 | 12/1987 | Rice et al. | 379/112 |
| 4,788,718 | 11/1988 | McNabb et al. | 379/113 |
| 4,924,491 | 5/1990 | Compton et al. | 379/127 X |
| 4,959,854 | 9/1990 | Cave et al. | 379/157 |
| 5,155,761 | 10/1992 | Hammond | 379/67 |
| 5,218,632 | 6/1993 | Cool | 379/126 |
| 5,230,017 | 7/1993 | Alexander | 379/140 |
| 5,247,569 | 9/1993 | Cove | 379/113 |
| 5,282,243 | 1/1994 | Dabbaghi et al. | 379/201 |
| 5,291,550 | 3/1994 | Levy et al. | 379/242 |
| 5,311,583 | 5/1994 | Friedes et al. | 379/266 X |
| 5,335,268 | 8/1994 | Kelly, Jr. et al. | 379/112 |

FOREIGN PATENT DOCUMENTS

| | | | |
|---|---|---|---|
| 58-225762 | 12/1983 | Japan | 379/265 |
| 3-203449 | 9/1991 | Japan | 379/127 |

*Primary Examiner*—Ahmad F. Matar
*Assistant Examiner*—Scott L. Weaver
*Attorney, Agent, or Firm*—Jean-Robert Mirville

[57] ABSTRACT

Billing records for call attempts directed to an inbound subscriber are sorted by originating telephone number, date and time of day in order to group together a) sequences of call attempts initiated at each telephone number, and b) corresponding disposition for each call attempt in that sequence. When the billing records indicate that all call attempts initiated from an originating telephone number have been unavailing (blocked calls, ring-no-answer), a caller associated with that telephone number is deemed "lost" with respect to a selected time window. The number of lost callers within a predetermined period of time is then used to determine the desirability of committing additional resources to a call center.

2 Claims, 5 Drawing Sheets

FIG. 2

| CALLER | ORIGINATING TELEPHONE NUMBER | DATE | HOUR | CALL DURATION IN SECONDS | CALL DISPOSITION |
|---|---|---|---|---|---|
| 1 | 201 572 5364 | 21 | 0900 | 0 | NO ANSWER |
|   | 201 572 5364 | 21 | 0902 | 0 | NO ANSWER |
|   | 201 572 5364 | 21 | 0905 | 0 | NO ANSWER |
|   | 201 572 5364 | 22 | 0930 | 120 | ANSWER |
| 2 | 201 572 6160 | 23 | 1134 | 75 | ANSWER |
| 3 | 201 949 2001 | 16 | 932 | 301 | ANSWER |
| 4 | 203 222 1649 | 19 | 1045 | 0 | NO ANSWER |
|   | 203 222 1649 | 19 | 1046 | 0 | NO ANSWER |
|   | 203 222 1649 | 19 | 1047 | 0 | NO ANSWER |
|   | 203 222 1649 | 19 | 1049 | 0 | NO ANSWER |
| 5 | 212 666 6677 | 4 | 1035 | 54 | ANSWER |
|   | 212 666 6677 | 5 | 800 | 68 | ANSWER |
| 6 | 215 898 8999 | 24 | 1143 | 678 | ANSWER |
| 7 | 218 667 7667 | 25 | 1038 | 45 | ANSWER |
|   | 218 667 7667 | 25 | 1100 | 82 | ANSWER |
|   | 218 667 7667 | 29 | 1213 | 794 | ANSWER |
| 8 | 718 678 9012 | 16 | 1400 | 0 | NO ANSWER |
|   | 718 678 9012 | 22 | 1032 | 98 | ANSWER |
| 9 | 908 777 0056 | 18 | 800 | 0 | NO ANSWER |
|   | 908 777 0056 | 18 | 930 | 0 | NO ANSWER |
|   | 908 777 0056 | 18 | 1008 | 21 | ANSWER |

FIG. 3

| CALLER | ORIGINATING TELEPHONE NUMBER | DATE | HOUR | CALL DURATION IN SECONDS | CALL DISPOSITION |
|---|---|---|---|---|---|
| 1 | 201 572 5364 | 22 | 0930 | 0 | ABANDONED |
| 2 | 201 572 6160 | 23 | 1134 | 0 | ABANDONED |
| 3 | 201 949 2001 | 16 | 0932 | 301 | ANSWERED |
| 4 | 212 666 6677 | 4 | 1035 | 0 | ABANDONED |
|  | 212 666 6677 | 5 | 0800 | 0 | ABANDONED |
| 5 | 215 898 8998 | 24 | 1143 | 678 | ANSWERED |
| 6 | 218 667 7667 | 25 | 1038 | 45 | ABANDONED |
|  | 218 667 7667 | 25 | 1100 | 82 | ABANDONED |
|  | 218 667 7667 | 29 | 1213 | 794 | ABANDONED |

INBOUND TELECOMMUNICATIONS SERVICES RESOURCES MANAGEMENT SYSTEM

This is a continuation of application Ser. No. 08/085,225 filed Jun. 30, 1993, now abandoned.

TECHNICAL FIELD

This invention relates to communication systems. More specifically, this invention relates to a method and a system for estimating the cost/performance tradeoffs of committing additional resources to a call center.

BACKGROUND

Low completion rates of telephone calls to an inbound telecommunications services subscriber, which may operate a Telemarketing Service Center (TSC), result in poor customer satisfaction, increased telecommunications expenses due to repeated call attempts, and, more importantly, potential lost business. In order to minimize the negative effects of low completion rates of telephone calls, telecommunications software vendors have devised detailed reporting systems to provide TSC managers with a broad gauge to assess staffing, line and equipment requirements. These systems provide measurements of various aspects of inbound traffic and agent performance, such as number of overflowed calls, number of calls handled per agent, and more importantly number of unanswered calls for a predetermined period of time.

SUMMARY

We have recognized that an uncompleted call due, for example, to a busy-line condition or abandonment of the call by the caller, does not necessarily translate into a lost caller since a caller who is unable to complete a call after a first attempt, may reinitiate one or more subsequent calls to the same destination number. Thus, a cost/benefit analysis of resources needed to meet a specific call completion rate objective, which is predicated on lost calls, as opposed to lost callers, is likely to yield results of dubious accuracy.

In accordance with the invention, the number of lost callers within a predetermined period of time is estimated to determine the desirability of committing additional resources to a call center, such as a telemarketing service center and the like.

In a preferred embodiment of the invention, billing records, such as Automatic Message Accounting (AMA) records collected by a telecommunications carrier for all call attempts directed to an inbound subscriber, are analyzed for a predetermined time period to determine the call disposition for each attempt within that time period. In the analysis, billing records for call attempts directed to an inbound subscriber are sorted by originating telephone number, date and time of day in order to group together a) sequences of call attempts initiated by callers at each telephone number, and b) corresponding disposition for each call-attempt associated with a particular telephone number. When the billing records indicate that all call attempts initiated from an originating telephone number have been unsuccessful (blocked calls, ring-no-answer), a caller associated with that telephone number is deemed "lost".

In some examples of the invention, calls that are abandoned by callers before receiving service are included in the lost caller category. Typically, those calls have been placed in a holding queue by a PBX or ACD located at the inbound subscriber premises for a period of time deemed too long by the callers.

In yet another example of the invention, if an inbound subscriber's PBX/ACD is incapable of generating an abandoned call report, the duration of a completed call in a sequence is analyzed to determine whether the caller (associated with the originating telephone number in the sequence) can be classified as a lost caller. For example, when an individual call or one call in a sequence of call attempts is completed, and the duration of the completed call is less than a predetermined threshold, it is presumed that the completed call was not answered by an attendant. More specifically, it is inferred that the caller abandoned the call after waiting for service in a holding queue for the duration of the call. If all calls in a sequence are either incomplete or of a duration less than a predetermined abandonment threshold, the caller associated with that sequence of calls is considered lost. The predetermined threshold may be, for example, a certain percentage of the typical time period needed to complete an average transaction for a particular inbound telecommunications service subscriber. A caller is also considered lost after one or more successful call attempts, if those calls are completed within a time frame that is outside a selected time period.

In another example of the invention, if the PBX/ACD is capable of generating a report indicative of call disposition for all calls completed to the PBX/ACD for a predetermined time period, the AMA records of all call attempts (for that time period) are merged with the PBX/ACD call disposition report to determine the final disposition of each call. After the combined records have been sorted by telephone number, time and date, the last record for each sequence of calls associated with a telephone number is analyzed to determine whether the call for the last record was unanswered or abandoned. If the call associated with the last record was unanswered or abandoned in queue, the caller is deemed a lost caller. If after one or more call attempts, a call is completed but within a time frame that is outside of a selected time window, the caller is also deemed lost.

The aggregate cost of all lost callers for a period of time is estimated to determine the cost performance ratio of committing additional resources to a Telemarketing Service Center. The cost of a lost caller may be estimated, for example, to be the foregone average revenue (or cost avoidance) generated per completed call. When the incremental cost of resources (measured for a selected period of time), such as cost of additional trunks, compensation for attendants, and other costs, exceeds the incremental cost of a lost caller (also measured for the same period of time), call completion rates objectives are deemed satisfactory. Conversely, when the incremental cost of a lost callers for a period of time exceeds the incremental cost of committing additional resources to a call center, the call completion rate for that center is deemed substandard.

Advantageously, telecommunications carriers can use the number of lost callers to convince subscribers of the potential benefits of engineering their facilities to a better grade of service. TSC managers concerned about committing additional resources to hire telephone attendants can get a better understanding of the tangible benefits to be gained from those resources when those benefits are balanced against the cost of these additional resources.

This summary only describes examples of the invention, the full scope of the invention is defined by the claims.

BRIEF DESCRIPTION OF THE DRAWING

FIG. 2 shows an illustrative report of AMA records of calls directed to an inbound subscriber with their corresponding call disposition;

FIG. 3 also shows a report of calls completed to an inbound subscriber premises equipment with their corresponding call disposition;

DETAILED DESCRIPTION

Figure 1:
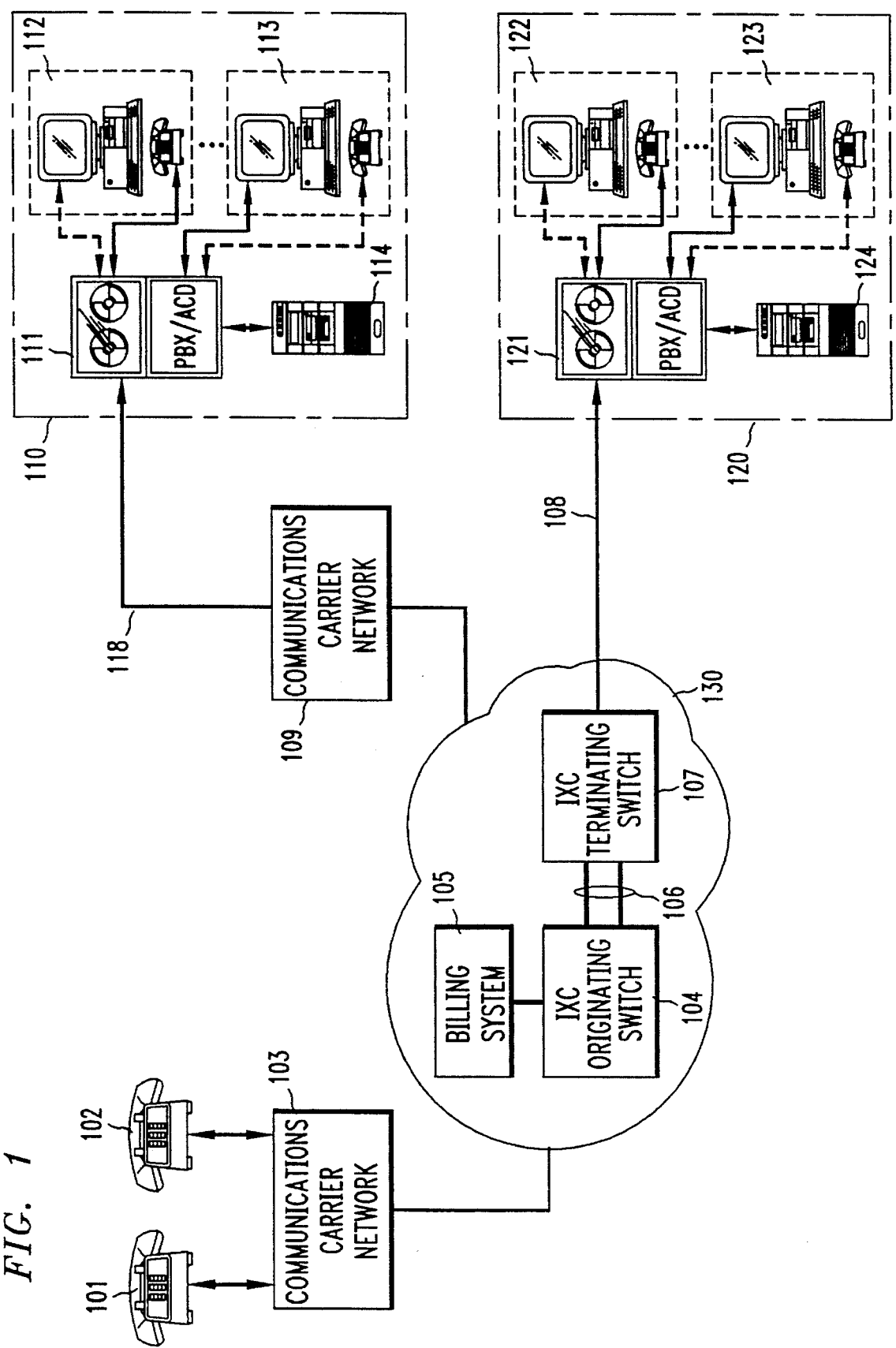
FIG. 1 is a schematic representation of a communications switching system arranged in accordance with the invention to identify lost callers.

FIG. 1 is a schematic representation of a communications switching system arranged in accordance with the invention to identify lost callers. In FIG. 1, a caller at station set 101 or 102 initiates a call destined to Telemarketing Service Centers (TSC) 110 or 120. The call is received by communications carrier network 103 which is comprised of central office switches, transmission circuits, and signaling facilities arranged to route calls to destinations designated by a caller. Upon determining that the call has to be handled by Inter-Exchange Carrier (IXC) network 130 for completion, communications carrier network 103 forwards the dialed number along with the calling party number to IXC 130. The latter includes a) toll switches, such as switches 104 and 107 interconnected by transmission lines, such as line 106 b) signaling systems and c) routing databases (not shown). Every call switched over IXC 130 is time-stamped and recorded at the originating toll switch. In this example, a billing system 105 is shown connected to toll switch 104. The billing system 105 is comprised of an adjunct processor with storage devices arranged to record data indicating a) the date and time calls are initiated b) the duration of calls c) the disposition of those calls, and d) the originating and destination telephone numbers. Those data are formatted in records called "Automatic Message Accounting" (AMA) records. IXC 130 switches the call to its final destination (at TSC 110 or 120) either via a terminating communications carrier network 109 and transmission facility 118; or via a dedicated transmission facility 108 that links terminating toll switch 107 to TSC 120. Transmission facilities 108 and 118 may be Integrated Services Digital Network (ISDN) trunks that each support, twenty-three bearer channels and one data channel. The combination of the bearer and data channels multiplexed over one ISDN trunk is commonly referred in the art as "23B+D" for short. When transmission facilities 108 and 118 are ISDN trunks, the calling party number can be forwarded to PBX/ACD 121 or 111 via the data (D) channel, thereby, allowing processors 124 and 114 to generate reports providing information regarding each individual call attempt.

As shown in FIG. 1, TSC 110 and 120 are comprised of Private Branch Exchanges/Automatic Call Distributor (PBX/ACD) 111 and 121, attendant stations 112/113, 122/123, and processors 114 and 124, respectively. PBX/ACD 111 and 121 are premises-based voice switching systems, designed to a) receive calls destined for TSC 110 and 120, respectively, b) queue incoming calls when all stations at TSC 110 or 120 are busy and c) distribute those calls to attendants or specific groups of attendants according to some prearranged scheme, such as a hunt group, to insure even call handling loads among attendants. PBX/ACD 111 and 121 may be implemented using, for example, the AT&T Definity® PBX with Automatic Call Distribution (ACD) capability. It is worth noting that an ACD may be integrated in either a PBX (as is the case for PBX/ACD 111 and 121) or a central office or toll switch. Thus, a so called "Network ACD" can adequately replace PBX/ACD 111 or 121 to implement the invention.

Connected to PBX/ACD 111 and 121 are processors 114 and 124, respectively. Processors 114 and 124 are general purpose computers loaded with software designed to collect data on time, date and duration on completed calls. Processors 114 and 124 also generate various kinds of reports on collected data associated with trunk utilization, attendant productivity, abandoned call rates, to name a few. Other software programs loaded in processors 114 and 124 include some of the instructions shown in FIGS. 4 and 5. Also included in TSC 110 and 120 are attendant positions 112/113 and 122 and 123, respectively. Each attendant position (112, 113, 122, 123) comprises a station set and an associated console that is used by an attendant to enter or receive data to complete a transaction with a caller.

FIG. 2 shows an illustrative report of AMA records of calls directed to an inbound subscriber with their corresponding call disposition. As indicated above, the AMA report is one of the reports generated by the billing system of a carrier to charge subscribers for their use of telecommunications services provided by the carrier. The report that is illustrated in FIG. 2 is created as a result of sorting AMA records by telephone number, date and time. Of particular importance in the records of FIG. 2 is the disposition of each call. As shown in FIG. 2, a call gets two mutually exclusive dispositions, namely "answered" or "no answer". A call is considered "answered" in an AMA record if the call was completed to a CPE such as, a telephone set, an answering machine or a PBX like PBX/ACD 111 or 121. Thus, when a caller is presented an announcement and/or is placed in a holding queue his or her call is considered answered. By contrast, a call disposition of "unanswered" is entered for a call, when either all the channels are busy, or when a ring-no-answer condition is encountered or more generally, when no answer supervision is provided. Other fields of interest in the report include a) the duration of the call which is measured in seconds, and b) the time when the call was initiated, measured from 0 to 24 hours to facilitate easier computation of time difference between calls.

FIG. 3 shows a report of calls terminated at an inbound subscriber premises equipment with the disposition for each call. As indicated above, the report of FIG. 3 is generated by processor 114 (124) attached to PBX 111 (121) of FIG. 1. FIG. 3 is very similar to FIG. 2 because the originating phone numbers, the date and time are sorted in ascending order. The main distinction between FIG. 2 and FIG. 3 is that the call disposition field in FIG. 3 indicates either that a call was abandoned by the caller or that a call was answered by a live attendant at TSC 110 or 120 of FIG. 1. Of particular significance is the fact that only records of calls terminated at PBX/ACD 111 and 121 appear in the report of FIG. 3. Thus, calls for which no answer supervision was generated due to busy-line condition or ring no answer condition, do not show up in the report of FIG. 3. Another feature of FIG. 3 is that call duration is measured from the time a live attendant answered the call to the time when the call is terminated by the attendant or the calling party. Thus, holding time for a call terminated at PBX/ACD 111 or 121 is measured by the call duration field in FIG. 2.

Figure 4:
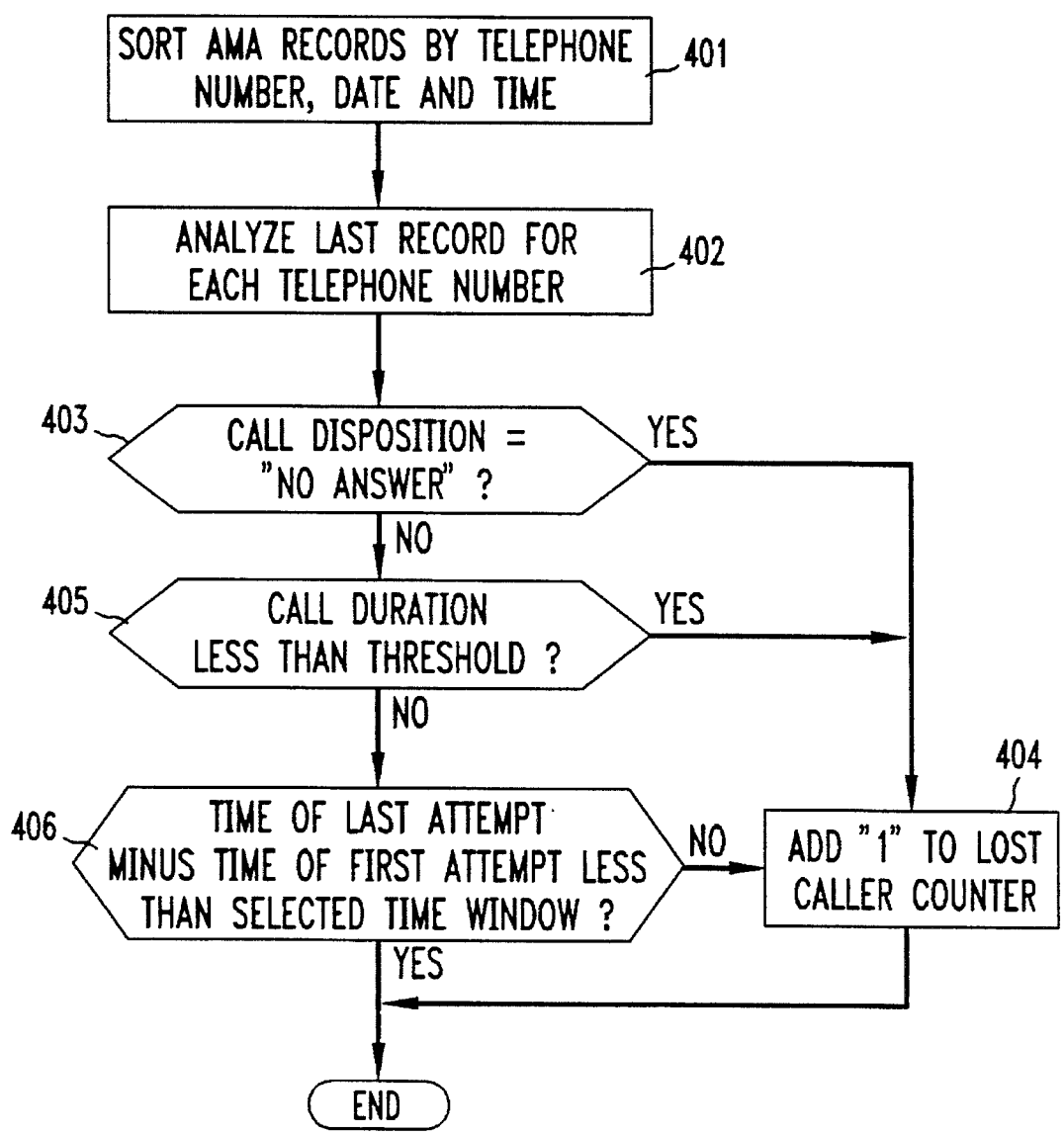
FIGS. 4 and 5 are flow diagrams representing functions performed by some of the components of FIG. 1.

FIGS. 4 is a flow diagram representing functions that are performed in processor 114 or 124 of FIG. 1 or by a processor in one the communications network in FIG. 1. The process of FIG. 4 is initiated in step 401 of FIG. 4 when the AMA records for a predetermined period of time are sorted by telephone number, date and time to create the report of FIG. 2. In this example, the last record for each telephone number is analyzed in step 402 to determine the call disposition for that record in step 403. If the call disposition field in that record indicates that the call was not answered, then in step 404, a lost caller counter (set to zero at the beginning of the process) is incremented by one ("1"). If the call was answered, the content of the call duration field is analyzed in step 405 to determine whether the call lasted longer than a predetermined amount of time. If the duration of the call did not exceed the predetermined amount of time, the lost caller counter is incremented by "1". For example, in FIG. 2, caller 8 would be considered a lost caller if the call lasted less than a time period of, for example twenty-two (22) seconds. The value of this predetermined time period is based on the mean time of an average transaction processed at the Telemarketing Service Center 110 or 120 of FIG. 1, which can be obtained empirically. For example, if the Telemarketing Service Center 110 or 120 is an airline reservation center and empirical data show that an average transaction handled at that center takes about three to four minutes to complete, the predetermined time period may be set for thirty seconds. This value is predicated on the premise that the caller abandoned the call after he or she was placed in an holding queue for more than thirty seconds.

If the call lasted more than the predetermined time period, the date and the time for the first record in that sequence of calls associated with a caller is compared to the date and time for the last record to determine in step 406, whether the resulting time period exceeds a selected amount of time. If so, the lost caller counter is incremented by "1". The selected amount of time chosen depends on the characteristics of the transactions processed at the telemarketing service center. For example, in a credit card verification application, the selected time window may be less than half an hour because it is presumed that a sales clerk who wishes to verify a credit card number would not attempt to reach the credit verification center for more than thirty minutes and, therefore, calls that are originated from the same telephone number within an hour of each other are associated with a different transaction (which may be viewed as a different "caller"). Similarly, for an airline reservation application, the selected time period may be one to two days.

Figure 5:
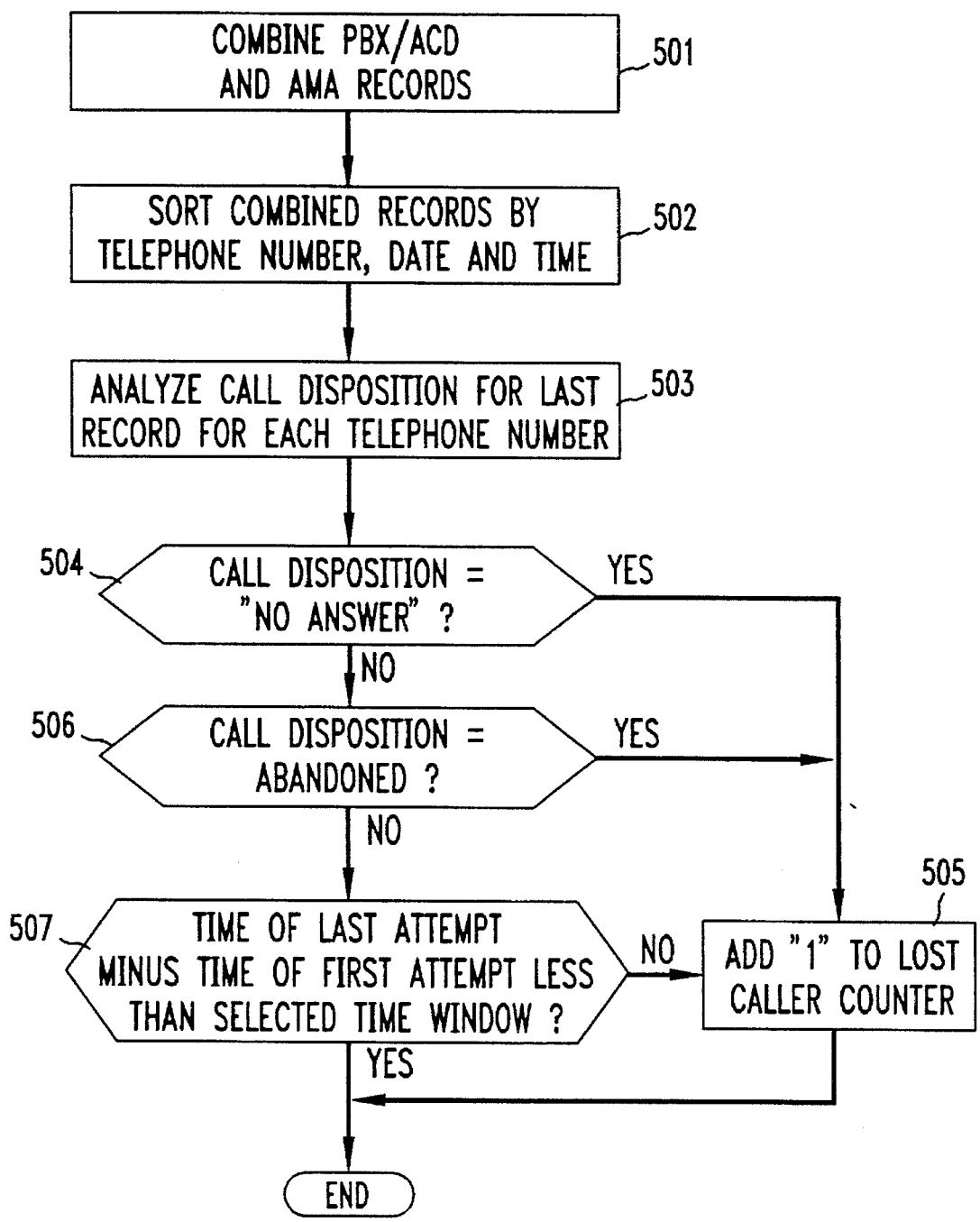

FIG. 5 is a flow diagram representing functions that are performed when PBX/ACD 110 or 120 of FIG. 1 is capable of generating a detailed report on call disposition for calls terminated on those PBX/ACDs. Those functions are initiated in step 501 of FIG. 5 when the AMA records (shown in FIG. 2) are combined with the PBX/ACD records (shown in FIG. 3). In step 502, the combined records are sorted by telephone number, date and time. Subsequently, the disposition of the call in the last record in each sequence of calls associated with a phone number is analyzed in step 503 to determine, in step 504, whether the call disposition field indicates that a "NO ANSWER" entry was keyed into that field. As mentioned above, a "NO ANSWER" entry in the call disposition field indicates that no answer supervision (busy, ring-no-answer) was provided for the call. If the call disposition field contains the "NO ANSWER" entry, in step 505, the lost caller counter is incremented by "1". Otherwise, a determination is made, in step 506, as to whether an "ABANDONED" entry is in the call disposition field. If so, in step 505, the lost caller counter is incremented by "1". If the call was not abandoned, in step 507, the date and the time for the first record in that sequence of calls is compared to the date and time for the last record in that sequence to determine, in step 507, whether the time difference period exceeds a selected time window. If so, the lost caller counter is incremented by "1".

Once the number of lost callers for a predetermined time period is estimated, well-known Erlang B methods may be used to derive (for a particular offered load) a table correlating number of additional calls to number of additional attendants needed to service those calls. Since, in accordance with the principles of the invention, each call handled by an added attendant directly impacts the number of lost callers, the cost/benefit ratio of adding resources to a telemarketing operation can be derived from the cost of losing a caller. One exemplary method to estimate the cost of losing a caller is to equate that cost to the foregone average revenue (or cost avoidance) generated per completed call. Thus, resources can be added to the operations of a telemarketing center when the incremental cost of a lost caller for a predetermined time period exceeds the incremental cost of added resources.

We claim:

1. A method of identifying lost callers for call attempts directed to a telecommunications service center having a customer premises equipment, wherein said method comprises the steps of:

generating billing records for a plurality of calls received by the customer premises equipment, wherein at least a portion of said billing records include fields selected from a group of such fields comprised of originating telephone number, date, time and disposition of a respective received call;

merging said billing records with records of unsuccessful call attempts directed at said telecommunications service center and initiated within a predetermined time period, wherein at least a portion of said unsuccessful call attempt records include fields selected from a group of such fields comprised of originating telephone number, date, time and disposition of a respective attempted call;

sorting the merged records in ascending order by originating telephone number, time and date to derive a sequence of merged and sorted records for each originating telephone number; and classifying a particular sequence of merged and sorted records as a lost caller if a last record in said sequence of merged and sorted records indicates one of the following call dispositions: a) busy line condition, b) ring-no-answer condition, and c) abandoned in queue condition.

2. A system of identifying lost callers for call attempts directed to a telecommunications service center having a customer premises equipment, wherein said system comprises:

means for generating billing records for a plurality of calls received by the customer premises equipment, each one of said billing records including fields selected from a group of such fields comprised of originating telephone number, date, time and disposition of a respective received call;

means for merging said billing records with records of unsuccessful call attempts directed at said telecommunications service center and initiated within a predetermined time period, each one of said unsuccessful call attempts records including fields selected from a group of such fields comprised of originating telephone number, date, time and disposition of a respective attempted call;

means for sorting the merged records in ascending order by originating telephone number, time and date to derive a sequence of merged and sorted records for each originating telephone number; and means for classifying a particular sequence of merged and sorted records as a lost caller if a last record in said sequence of merged and sorted records indicates one of the following call dispositions: a) busy line condition, b) ring-no-answer condition, and c) abandoned in queue condition.

* * * * *